United States Patent [19]
Becker et al.

[11] 3,966,982
[45] June 29, 1976

[54] PROCESS AND APPARATUS FOR TREATING OLEAGINOUS SEED MATERIAL

[75] Inventors: Kenneth W. Becker; Klemens C. Baczewski; Donald J. Klein, all of Pittsburgh, Pa.

[73] Assignee: Dravo Corporation, Pittsburgh, Pa.

[22] Filed: June 18, 1973

[21] Appl. No.: 371,148

[52] U.S. Cl. ............................ 426/430; 426/634; 260/123.5; 23/267 R
[51] Int. Cl.² ............................................ A23L 1/20
[58] Field of Search ............... 260/123.5, 123.5 R; 426/430, 431, 372, 374, 634; 127/29, 30, 34; 23/267 R, 267 A, 267 B; 203/73, 75, 76, 78, 79, 80, 84, 85; 202/158, 159

[56] References Cited
UNITED STATES PATENTS

| | | | |
|---|---|---|---|
| 2,467,402 | 4/1949 | Pascal | 260/123.5 |
| 2,585,793 | 2/1952 | Kruse | 426/431 |
| 2,756,668 | 7/1956 | Seed et al. | 260/123.5 |
| 3,207,744 | 9/1965 | O'Hara et al. | 260/123.5 |
| 3,365,440 | 1/1968 | Circle et al. | 426/430 X |

FOREIGN PATENTS OR APPLICATIONS

| | | | |
|---|---|---|---|
| 516,340 | 1/1940 | United Kingdom | 260/123.5 |

*Primary Examiner*—Raymond N. Jones
*Assistant Examiner*—Esther L. Massung
*Attorney, Agent, or Firm*—Marn & Jangarathis

[57] ABSTRACT

There is described a process and apparatus for treating oleaginous seed materials, such as soybean flakes with an extraction solvent, which includes an extraction zone, a desolventizing zone, and a miscella treating zone. In the extraction zone, the oleaginous seed material is subjected to concurrent contact with a carbohydrate-selective extraction solvent in a plurality of extraction vessels arranged in countercurrent fluid relationship therebetween with the expression of treated solids being effected after each extraction. The expressed solids from the last extracting vessel are passed to a desolventizing zone wherein residual solvent is vaporized by the respective indirect and direct contact with a heat transfer medium, such as steam, to produce a protein concentrate having a concentration (moisture free basis) of proteinaceous matter of at least about 70% by weight (6.25 times the total nitrogen content by the Kjeldahl method).

The miscella is passed to a miscella treating zone which includes fractionating columns operating at different pressure levels in a multiple effect type of distillation system. The miscella is first introduced into a low pressure fractionating column and passed in indirect heat transfer relationship with the gaseous overhead from a second fractionating column to evaporate a portion of the extraction solvent. The bottoms from the low pressure fractionating column are then passed to the second fractionating column operating at a higher pressure and are passed in direct heat transfer relationship with steam and reboiled vapors to evaporate substantially all of the remaining portions of the extraction solvent with the liquid bottoms or whey being withdrawn for further processing.

35 Claims, 2 Drawing Figures ns, such as soybeans, cotton seeds, peanuts, sesame seeds, sunflower seeds, rapeseed, and the like contain proteinaceous matter of a highly nutritious nature have found many uses in the arts. Soybeans for example, after oil extraction, have been treated to recover the proteinaceous matter for use in diverse industrial processes, e.g. in the paper, plastic and food industries.

PROCESS AND APPARATUS FOR TREATING OLEAGINOUS SEED MATERIAL

BACKGROUND OF THE INVENTION

This invention relates to the treatment of oleaginous seed material, and more particularly to the treatment of defatted oleaginuous seed material to form a proteinaceous product.

Oleaginuous seed materials, such as soybeans, cotton seeds, peanuts, sesame seeds, sunflower seeds, rapeseed, and the like contain proteinaceous matter of a highly nutritious nature have found many uses in the arts. Soybeans for example, after oil extraction, have been treated to recover the proteinaceous matter for use in diverse industrial processes, e.g. in the paper, plastic and food industries.

Many processes are being practiced with the most common process including the step of contacting the oleaginous seed material in flake or meal form with an organic solvent to extract oil therefrom thereby forming a defatted residual seed material which is contacted with an alkali solution to dissolve the proteinaceous matter subsequently precipitated by an acid, such as described in U.S. Pat. No. 2,589,867 to Circle. The proteinaceous matter recovered is generally referred to as an "alkali-soluble, acid precipitated protein".

In another process, defatted soybean flakes are contacted with an acidic solution to dissolve primarily the non-proteinaceous matter including certain enzyme systems, ash flavoring, ingredients and carbohydrates, such as saponin, sucrose, raffinose and stachyose together with minor quantities of proteinaceous matter, with the residual substance being utilized as a proteinaceous composition in the food industry, such as described in U.S. Pat. No. 2,881,076 to Sair.

In still another process, the defatted soybean flakes are treated with an aqueous alcohol solution to extract the non-proteinaceous matter, primarily the carbohydrates (sometimes referred to as "whey"), with minimal extraction of water soluble proteins, such as described in U.S. Pat. No. 3,307,744 to O'Hara et al or U.S. Pat. No. 3,365,440 to Circle et al. As used herein the term "miscella" refers to a solution of extracted soluble matter in an extraction solvent.

While the latter two processes have been effective in producing protein concentrates, the quantity of the whey remaining in the product concentrate has limited its application for certain end uses. Additionally, such processes suffered from large liquid to solids ratio which place excessive loads on the desolventizer apparatus. The steam requirement to recover solvent has been excessive as well as requirements for additional heat transfer capabilities in the processes.

OBJECTS OF THE INVENTION

An object of the present invention is to provide an improved process and apparatus for treating oleaginous seed materials.

A further object of the present invention is to provide an improved process and apparatus for extracting oleaginous seed material with the concurrent contact of solids and solvent.

A still further object of the present invention is to provide an improved process and apparatus for extracting substantially all of the soluble non-proteinaceous matter from oleaginous seed materials to form a protein concentrate containing substantially all of the proteinaceous matter present in the oleaginous seed materials.

A still further object of the present invention is to provide an improved process and apparatus for preparing a protein concentrate having a concentration (on a moisture free basis) of proteins of at least 70% by weight from defatted soybean flakes.

An additional object of the present invention is to provide a novel process and apparatus for treating miscella.

Another object of the present invention is to provide an improved process and apparatus for simultaneously separating non-proteinaceous matter from an extraction solvent at different solvent concentrations in a process for preparing a protein concentrate from oleaginous seed material.

A further object of the present invention is to provide a novel method and apparatus of utilizing the non-proteinaceous matter extracted from oleaginous seed material.

Still another object of the present invention is to provide an improved process and apparatus for preparing a protein concentrate from oleaginous seed material having a high protein dispersibility index (P.D.I.).

Still another object of the present invention is to provide an improved process and apparatus for the separation of an organic solution from non-proteinaceous matter with greatly reduced steam requirements in a process for extracting non-proteinaceous matter from defatted oleaginous seed material.

SUMMARY OF THE INVENTION

These and other objects of this invention are achieved in a process for treating oleaginous seed materials, such as soybean flakes with a carbohydrate selective extraction solvent, which process includes an extraction zone, a desolventizing zone, and a miscella treating zone. In the extraction zone, constituting one aspect of the present invention, the oleaginous seed material is subjected to contact with a carbohydrate-selective extraction solvent in an extraction vessel with the expression of treated solids being effected after extraction, preferably in a plurality of vessels arranged in countercurrent flow relationship followed by expression. The carbohydrate-selective extraction solvent includes aqueous organic solutions of the low molecular weight alkanols, such as methanol, ethanol, propanol; dioxane; dimethyl sulfoxide and the like. It is understood by those skilled in the art, that water is an extraction solvent for carbohydrates and proteinaceous matter contained in defatted soybean flakes, and that the addition of such an organic material inhibits the solubility of proteins in the extraction solvent. The expressed solids from the extracting vessel are passed to a desolventizing zone, constituting another aspect of the present invention, wherein extraction solvent (particularly the organic component thereof) is vaporized by the respective indirect and direct contact with a heat transfer medium, such as steam, under conditions minimizing denaturation of the proteinaceous matter. A product protein concentrate is withdrawn from the desolventizing zone having a concentration (moisture free basis) of proteinaceous matter of at least about 70% by weight (6.25 times the total nitrogen content measured by the Kjeldahl method).

The miscella is passed to a miscella treating zone which constitutes a further aspect of the present invention, and includes fractionating columns operating at different pressure levels in a multiple effect type of distillation system. The miscella is first introduced into a low pressure fractionating column and passed in indirect heat transfer relationship with the gaseous overhead from a second fractionating column to evaporate a portion of the extraction solvent. The bottoms from the low pressure fractionating column are then passed to the second fractionating column operating at a higher pressure and are passed in indirect heat transfer relationship with a heat transfer medium, such as steam, to evaporate substantially all of the remaining portions of the extraction solvent with the liquid bottoms or whey being withdrawn for further processing, such as the addition to defatted soybean meal.

BRIEF DESCRIPTION OF THE DRAWINGS

A better understanding of the present invention as well as additional objects and advantages thereof will become apparent upon consideration of the detailed disclosure thereof, especially when taken with the accompanying drawings, wherein like numerals designate like parts throughout, and wherein.

DETAILED DESCRIPTION OF THE INVENTION

Figure 1:
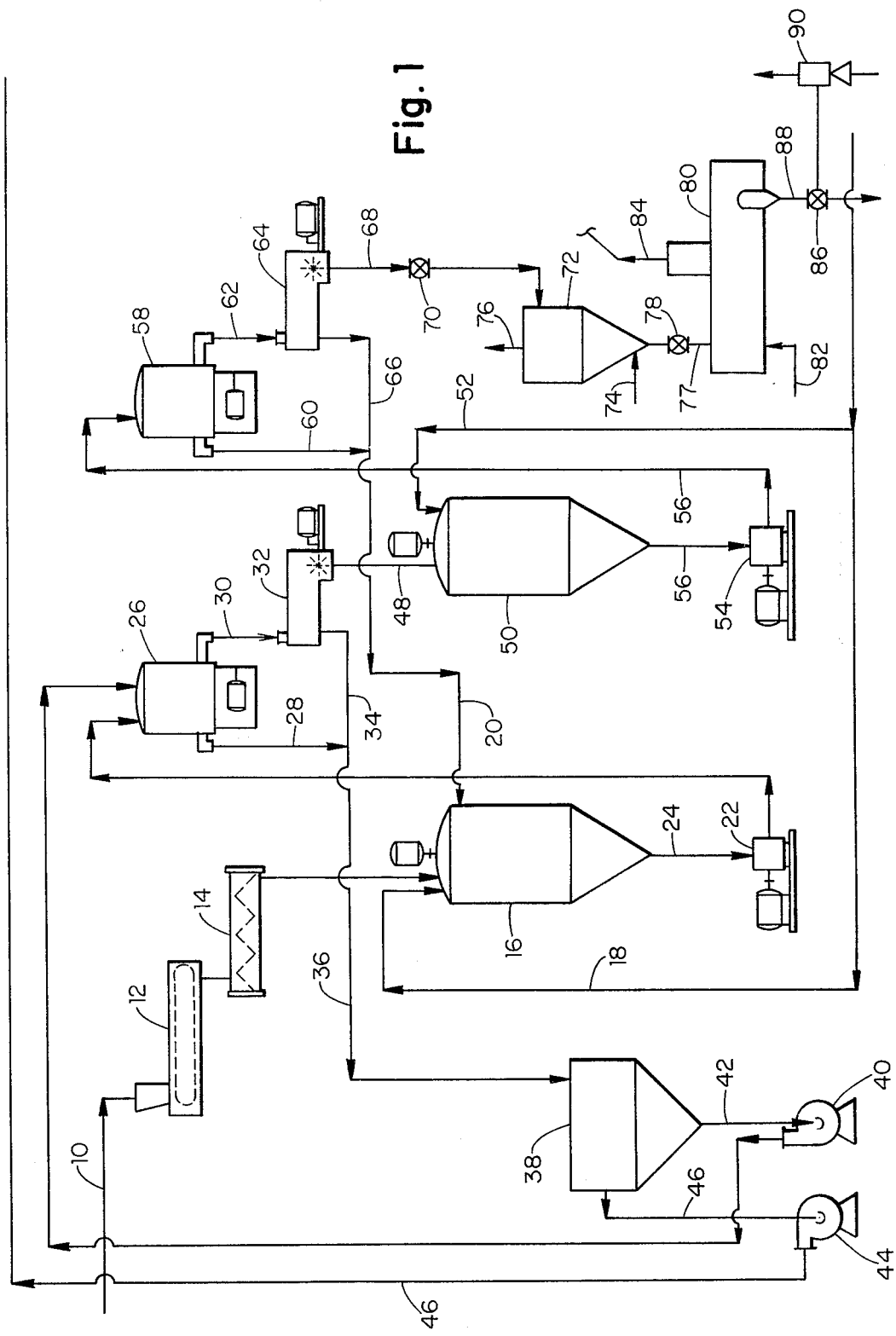
FIG. 1 is a schematic flow diagram of a portion of the process and apparatus of the present invention.

It is to be understood that equipment, such as certain pumps, valves, indicators, and the like have been omitted from the drawing to facilitate the description thereof and that the placing of such equipment at appropriate places is deemed to be within the scope of those skilled in the art. To facilitate an understanding of the present invention, the process and apparatus therefor will be described with reference to the treatment of defatted soybean flakes, it being understood that other oleaginous seed materials, such as cotton seeds, peanuts, sesame seeds, sunflower seeds, rapeseed, and the like may be used. Defatted soybean flakes are the residue from the extraction of oil from soybean flakes using hexane or other solvents in a so-called solvent extraction process. Such soybean flakes contain proteins, carbohydrates, ash, fiber and minor quantities of other materials.

Referring to the FIG. 1, defatted soybean flakes in line 10 are passed successively through a flake feeder 12 and a seal conveyor 14 and introduced into a first stage contactor or extractor 16 wherein the flakes are passed in concurrent contact with a lean or fresh extraction solvent stream in line 18 and a second stage miscella stream in line 20. The concentration of organic material in the lean or fresh aqueous extraction solvent stream is between about 20 to 90 percent, preferably of from 40 to 60 percent. The first stage extractor 16 is operated at a temperature of from about 75° to about 175°F., preferably between about 125° to 130°F., at residence times of the flakes of from about 5 to about 60 minutes, preferably about 15 minutes. The ratio of lean solvent to second stage miscella is generally of from about to 1:2 to 1:4, and preferably at about 1:2.75, with a solvent to flake ratio of from about 5:1 to 10:1, preferably about 8.25:1.

A slurry of the partially extracted flakes and miscella is withdrawn from extractor 16 by pump 22 in line 24 and passed to a screen concentrator 26 wherein a major portion of the miscella is separated from the partially extracted flakes and withdrawn by line 28. The partially extracted flakes and a minor portion of the miscella are withdrawn from the concentrator 26 by line 30 and are introduced into a first stage expressor 32, such as a continuous screw press manufactured by the RIETZ MANUFACTURING COMPANY, wherein a further portion of the miscella is separated from the flakes and withdrawn by line 34 and combined in line 36 with the miscella in line 28 and passed to a fines separator 38. Fines together with a minor portion of miscella therein are withdrawn from separator 38 by pump 40 in line 42 and returned to the screen concentrator 26 with the major portion of the miscella being withdrawn by pump 44 in line 46 and passed to the miscella treating zone, as more fully hereinafter described.

The partially extracted flakes in the first stage expresser 32 is subjected to the mechanical action to reduce the amount of extraction solvent and dissolved whey content thereof prior to passage by line 48 to a second stage extractor 50 wherein the solids are passed in concurrent contact with the lean extraction solvent stream introduced into the second stage extractor 50 by line 52. The second stage extractor 50 is operated at a temperature of from about 75° to 175°F., preferably 125° to 130°F. at residence times of the flakes of from about 5 to 60 minutes, preferably 15 minutes with an extraction solvent to solids ratio of from about 5:1 to 10:1, preferably about 5:1.

A slurry of extracted solids and second stage miscella is withdrawn from the second stage extractor 50 by pump 54 in line 56 and passed to a second stage concentrator screen 58 wherein a major portion of second stage miscella is separated from the extracted solids and withdrawn by line 60. The extracted solids and a minor portion of second stage miscella are withdrawn from the concentrator 58 by line 62 and are introduced into a second stage expresser 64 wherein a further portion of second stage miscella is separated from the extracted solids and withdrawn by line 66 to be combined with the portion of second stage miscella in line 60 thereby forming the second stage miscella in line 20. Thus, in one aspect of the present invention, extraction of the carbohydrate fraction from defatted soybean flakes is effected with the concurrent contact of solids and liquids in contactors or extractors arranged in a countercurrent flow relationship to effectively extract substantially all of the carbohydrate matter to subsequently provide a protein concentrate having a protein concentration (moisture free basis) of greater than 70% by weight after treatment to reduce the extraction solvent, as more fully hereinafter discussed.

As will be readily appreciated, the mechanically expressed solids withdrawn from the first stage expresser 32 have a high liquid absorbing capacity for contact with less extraction solvent to thereby increase the solution concentration of whey in the miscella to be subsequently treated in the miscella treating zone. Additionally, expression after the final stage of extraction reduces energy requirements in the desolventizing zone.

The extracted solids in line 68 under the control of a rotary valve 70 are passed to a first stage desolventizer 72 wherein a major portion of the extraction solvent in the extracted solids is removed by vaporization by indirect contact of the solids with a heat transfer medium, such as steam in line 74. A gaseous stream is passed by line 76 to the miscella treating zone after removal of fines in a suitable separation unit (not shown).

The partially desolventized flakes withdrawn from the desolventizer 72 are passed by line 77 under the control of rotary lock valve 78 to a second stage desolventizer 80 (or sometimes referred to as a "deodorizer" in the art) wherein extraction solvent removal is substantially completed by the direct contact thereof with a heat transfer medium, such as steam in line 82. A gaseous overhead in line 84 is withdrawn from the second stage desolventizer 80 and is passed to a condenser (not shown). Generally, the second stage desolventizer 80 is operated under subatmospheric pressure by providing a rotary valve 86 in solids outlet conduit 88 including a steam jet ejector 90 to obtain such a pressure condition. A protein concentrate containing at least 70 percent by weight of proteinaceous matter (based on treating defatted soybean flakes) is withdrawn from the desolventizer 80 by line 88 and is passed to further processing operations (not shown), such as cooling, weighing, bagging and storage.

Figure 2:
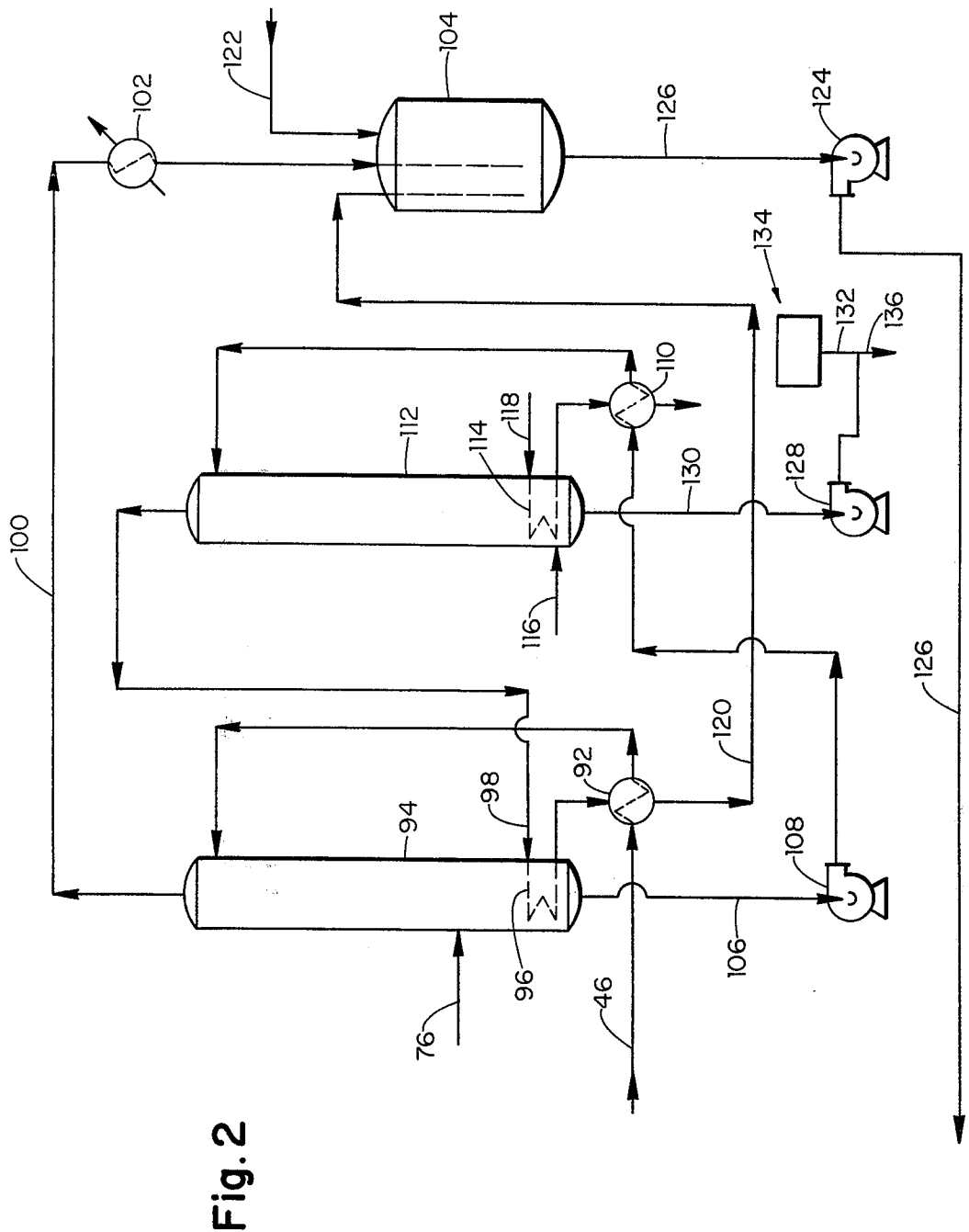
FIG. 2 is a schematic flow diagram of the remaining portion of the process and apparatus of the present invention.

The miscella in line 46, referring now to FIG. 2, is passed to the miscella treating zone comprised of two fractionating columns operating at different thermodynamic levels having a conduit configuration similar to multiple effect distillation systems. The miscella in line 46 is preheated in exchanger 92, and is introduced into a first fractionating column or tower 94 including reboiler 96 wherein the preheated miscella is passed in indirect contact with reboiled vapors produced by a heat transfer medium in line 98 passing through the reboiler 96. The overhead vapors in line 100 including a major portion of the extraction solvent are withdrawn from the fractionating column 94 and are passed through a condenser 102 with condensate being introduced into a solvent recovery tank 104.

The column bottoms in line 106 withdrawn from the fractionating column 94 by pump 108 are passed through a heat exchange 110 and introduced into the upper portion of a second fractionating column 112 including a reboiler 114 operating under a higher pressure than the fractionating column 94, as more fully hereinafter discussed. In the fractionating column 112, the partial miscella is passed in direct contact with vapors including steam introduced by line 116 and reboiled vapors produced by passing a heat transfer medium in line 118, such as steam, through the reboiler 114. The overhead vapors withdrawn from the fractionating column 112 constitute the heat transfer medium in line 98 for providing the reboiled heat requirements of the fractionating column 94. By passage through the reboiler 96 and subsequently by line 120 through heat exchange 92, the vapors in line 98 are condensed with the resulting condensate being passed through line 120 to the solvent recovery vessel 104 or a second recovery vessel (not shown) if a two level solvent concentration is desired for extraction, although it is understood that the solvent could be directly passed to the extraction zone for a two level process.

Make-up liquids, as required, are introduced by line 122 into the solvent recovery vessel 104. Solvent required for the extraction zone is withdrawn in line 126 by pump 124 and constitutes the lean or fresh extraction solvent streams in line 18 and 52. The extracted material or whey is withdrawn from the fractionating column 112 by pump 128 in line 130 and passed to subsequent processing operations, such as disposal thereof by bacterial treatment, combustion or other processes (not shown) known to those skilled in the art.

In one aspect of the present invention, the whey in line 130 is combined with meal in line 132 from a desolventizing system of a soybean oil extraction plant, generally indicated as 134, which ordinarily is located proximate to a plant construction for operation in accordance with the present invention, it being understood that the whey may be added to other forms of meal. The carbohydrates are added to the meal as a soluble product in line 136, such as cattle feed, with the amount of water being adjusted in accordance with the operation of the desolventizing system of such oil extraction plant 134. For example, if such oil extraction plant has excess capacity in the desolventizing system for the removal of water from the solids, then this is the preferred method of disposing of water to maintain a water balance on the protein concentrate system. If limited water removal capabilities exist in the desolventizing system, then steam (substantially solvent free) is bled from the vapor space proximate the bottom of the fractionating column 112 of the protein concentrate plant.

Generally, column 94 is operated at about atmospheric pressure with column 112 being operated at above atmospheric pressure, although it will be understood that the column 112 may be operated at atmospheric pressure with column 94 being operated at sub-atmospheric pressure. Accordingly, by treating the full miscella as described above, a substantial reduction in steam requirements is obtained with a concomitant reduction in operating costs. Additionally, greater flexibility is obtained with the miscella treating zone of the present invention by the heat exchange between streams thereof thereby permitting operation at levels of dissolved solids in the miscella of 4 percent or less. Further, by using a fresh aqueous extraction solvent at concentrations of the organic component from about 40 to 60 percent in the extraction zone at the aforementioned flake and solvent ratios, it is possible to control certain functional properties of the protein concentrate, e.g. improved protein dispersibility index, a measure of water dispersibility of the product. Additionally, introduction of steam directly into the higher pressure fractionating column 112 provides flexibility to the system whereby the system may be finely tuned by permitting an additional degree of freedom in controlling feed stream splits.

Examples of the Invention

The following example is illustrative of conditions of the process of the invention, it being understood that the scope of the present invention is not to be limited thereby.

There is introduced into the first stage extractor 16, 4.165 pounds per hour of defatted soybean flakes having the following analysis:

| Component | Wt. % |
|---|---|
| Concentrate | 60.0 |
| Whey | 29.9 |
| Water | 10.1 |
| | 100.0% |

The flakes are passed in concurrent contact with 11,450 pounds per hour of a 40% ethanol solution in line 18 at a temperature of 125°F. and 22,990 pounds per hour of a partial miscella in line 20. The slurry of flakes is passed through the concentrate screen 26 and expresser 32 for separation of 34,180 pounds per hour of full miscella which is passed by line 36 to fine separator 38. From separator 38, 31,640 pounds per hour of full miscella is passed in line 46 by pump 44 to the miscella treating zone.

Particulated partially extracted solids (and solvents) at the rate of 6,966 pounds per hour are introduced into a second stage extractor 50 and passed in concurrent contact with 22,900 pounds per hour of a 40 percent ethanol solution in line 52 at a temperature of 125°F. The flake slurry is passed respectively through the second stage concentrator 58 and expresser 64 to separate the partial miscella stream in line 20. Extracted solids at the rate of 6,875 pounds per hour are passed in line 68 through the desolventizers 72 and 80 operating at a temperature of about 205° and 150°F. and at a pressure of 760mm and 190mm of mercury, respectively. 2,825 pounds per hour of a protein concentrate is withdrawn from the second stage desolventizer 80 and contains less than 2.0 percent of soluble carbohydrate materials with trace amounts of the organic portion of the extraction solvent.

The full miscella in line 46 is passed to the miscella treating zone having line compositions as set forth in Table I, below, to recover more than 99 percent of the organic portion of the extraction solvent introduced into the extraction zone with the pressure in the fractionating columns 94 and 112 being maintained at 15.2 psia. and 50 psig., respectively:

TABLE I

| Component | | | Wt.% | | |
|---|---|---|---|---|---|
| Line | 46 | 100 | 106 | 98 | 130 |
| Whey | 3.9 | | 8.8 | | 37.7 |
| Water | 57.4 | 45.3 | 80.0 | 87.3 | 62.0 |
| Ethanol | 38.7 | 54.7 | 11.2 | 12.7 | 0.3 |
| °F. | 125 | 203 | 210 | 295 | 298 |

As hereinabove discussed when processesing defatted soybean flakes, a protein concentrate is recovered having a protein contraction (moisture free basis) of at least 70% by weight. It will be understood that protein concentration for a protein concentrate obtained by processing for other types of oleaginous seed will vary with such starting material. Additionally, while the extraction zone is described as being comprised of two extraction vessels having associated expressers, it is understood that one or three or more extraction vessels having associated expressers may be provided depending on the starting feed material and the desired quality of the product. The same premise applies to the miscella treating zone in that more than two fractionating columns may be arranged in a multiple effect type of distillation system. While the process of the present invention has been described as being operated continuously, it is understood that the process could be operated in a batch-wise manner as would be readily apparent to one skilled in the art. The extraction aspect of the process of the present invention has been described with reference to the extraction of soluble carbohydrates to produce as a final product a protein concentrate, however, it will be understood that the extraction aspect of the present invention is applicable to the extraction of proteinaceous material in an appropriate solvent from a pre-treated oleaginous seed material in a protein isolate process, or even in a soybean oil extraction process. It will also be appreciated that the miscella treating zone is not only applicable to the treatment of a whey-enriched miscella but may be applicable to miscella treatment, per se, such as a soybean oil-enriched hexane solution. It is noted that water is introduced into the system in the feed material and in tthe form of steam required for desolventizing the protein concentrate, and is withdrawn from the system in the product protein concentrate and whey.

While the invention has been described in connection with one exemplary embodiment thereof, it will be understood that many modifications will be apparent to those of ordinary skill in the art; and that this application is intended to cover any adaptations or variations thereof.

What is claimed is:

1. In a process for treating a defatted oleaginous seed material to extract soluble non-proteinaceous materials therefrom to form a proteinaceous concentrate, the steps comprising:
   a. contacting said oleaginous seed material with a first carbohydrate selective extraction solvent flow under conditions to extract a portion of said non-proteinaceous materials;
   b. expressing the slurry of solids of step (a) to separate a first miscella stream from a first solids-solvent stream;
   c. contacting said first solids-solvent stream of step (b) with a second carbohydrate-selective extraction solvent flow under conditions to extract substantially the remaining portion of said non-proteinaceous material therefrom; and
   d. expressing the slurry of solids of step (c) to separate a second miscella stream from a second solids-solvent stream.

2. In a process for treating a defatted oleaginous seed material to extract soluble non-proteinaceous materials therefrom to form after desolventizing a protein concentrate, the steps comprising:
   a. passing said oleaginous seed material in concurrent contact with a first carbohydrate selective extraction solvent flow under conditions to extract a portion of said non-proteinaceous materials;
   b. expressing the slurry of solids of step (a) to separate a first miscella stream from a first solids-solvent stream;
   c. passing said first solids-solvent stream of step (b) in concurrent flow with a second carbohydrate-selective extraction solvent flow under conditions to extract substantially the remaining said non-proteinaceous material therefrom; and
   d. expressing the slurry of solids of step (c) to separate a second miscella stream from a second solids-solvent stream.

3. The process as defined in claim 2 wherein said oleaginous seed material is defatted soybean flakes.

4. The process as defined in claim 1 wherein said second miscella stream constitutes a portion of said first carbohydrate-selective extraction solvent flow.

5. The process as defined in claim 1 wherein fresh carbohydrate-selective extraction solvent constitutes a portion of said first extraction solvent flow.

6. The process as defined in claim 1 wherein fresh carbohydrate-selective extraction solvent is said second carbohydrate-selective extraction solvent flow.

7. The process as defined in claim 6 wherein said fresh carbohydrate-selective extraction solvent is an aqueous organic solution having a concentration of organic material of between 20 to 90 percent.

8. The process as defined in claim 3 wherein the ratio of extraction solvent to soybean flakes is between about 5:1 to 10:1 for said contacting steps.

9. The process as defined in claim 3 wherein residence times for steps (a) and (b) are between about 5 to 60 minutes.

10. The process as defined in claim 3 wherein extraction solvent is removed from said second solids-solvent stream to form a solid protein concentrate having a protein concentration (dry basis) of at least about 70% by weight.

11. The process as defined in claim 1 wherein said first miscella stream is passed to a solvent treating zone comprised of at least two fractionating columns operating at different pressure levels to recover extraction solvent.

12. The process as defined in claim 11 wherein fresh extraction solvents of different concentration are used to form said first and second extraction solvents flows.

13. The process as defined in claim 1 wherein said extraction solvent is an aqueous organic solution of a low molecular weight alkanol.

14. An apparatus for the treatment of a defatted oleaginous seed material which is comprised of:
   a. a first contacting means for contacting said oleaginous seed material with a first extraction solvent flow;
   b. a first expression means for separating a first extraction solvent stream from a first solids-solvent stream;
   c. a first conduit means connecting said first contacting means with said first expression means;
   d. a second contactiing means for contacting said first solid-solvent stream with a second extraction solvent flow:
   e. a second conduit means connecting said first expression means with said second contacting means;
   f. a second expression means for separating a second solvent stream from a second solids-solvent stream; and
   g. a third conduit means connecting said second contacting means with said second expression means.

15. In a process for treating oleaginous seed material from which a soluble material has been extracted therefrom by an extraction solvent, the steps of removing residual quantities of solvent from an extraction solvent containing solids material, the steps comprising:
   a. introducing said solvent pre-treated seed material into a first contact zone maintained at about atmospheric pressure and subjecting said solvent pre-treated seed material to an indirect contact with steam to vaporize solvent therefrom;
   b. withdrawing a solid material from said first contact zone;
   c. introducing said solid material into a second contact zone maintained at a pressure lower than that of said first contact zone and subjecting said solid material to direct contact with steam to vaporize substantially all the remaining to extraction solvent in said solid material; and
   d. withdrawing a substantially solvent free solid material from said second contact zone.

16. The process as defined in claim 15 wherein said heat transfer medium is steam.

17. The process as defined in claim 15 wherein said solvent pre-treated seed material is a defatted and decarbohydrated soybean flake with said solvent-free solid material being a protein concentrate.

18. A process for treating miscella to recover extraction solvent therefrom which comprises:
   a. introducing miscella into a first fractionating zone in which said miscella contacts reboiled vapors;
   b. withdrawing a portion of said extraction solvent as overhead from said first fractionating zone;
   c. withdrawing bottoms from said first fractionating zone and introducing said bottoms into a second fractionating zone in which said bottoms contact reboiled vapors, said second fractionating zone being operated at a pressure higher than said first fractionating zone;
   d. withdrawing a bottoms from said second fractionating zone; and
   e. withdrawing a second portion of said solvent as overhead from said second fractionating zone and passing said overhead to said first fractionating zone as a source of reboiled vapors therefor.

19. The process as defined in claim 18 wherein a heat transfer medium is passed in indirect contact with said bottoms of step (a) prior to introduction into said second fractionating zone a source of reboiled vapors therefor.

20. The process as defined in claim 19 wherein steam is introduced directly into the lower portion of said second fractionating zone.

21. The process as defined in claim 18 wherein said miscella is passed in indirect heat transfer relationship with said overhead from said second fractionating zone prior to introduction of said miscella into said first fractionating zone.

22. The process as defined in claim 18 wherein said bottoms from said first fractionating zone is passed in indirect heat transfer relationship with said heat transfer medium prior to introduction into said second fractionating zone and subsequent to the passage of said heat transfer medium through said second fractionating zone.

23. The process as defined in claim 18 wherein said overhead from said first fractionating zone is condensed and passed to a storage vessel.

24. The process as defined in claim 23 wherein said bottoms from said overhead from said second fractionating zone is passed to said storage vessel after passage through said first fractionating zone.

25. The process as defined in claim 18 wherein said miscella is comprised of an aqueous organic solution including dissolved solids.

26. The process as defined in claim 25 wherein said dissolved solids include carbohydrates extracted from a defatted soybean flake.

27. The process as defined in claim 26, wherein the bottoms from said second fractionating zone are admixed with defatted meal.

28. The process as defined in claim 27 wherein said meal is defatted and desolventized soybean meal.

29. The process as defined in claim 18 wherein said first fractionating column is operated at subatmospheric pressures.

30. The process as defined in claim 18 wherein said first fractionating column is operated at about atmospheric pressure.

31. An improved animal feed which comprises adding an aqueous carbohydrate solution obtained by extracting carbohydrates which are soluble in an extracting solvent and which are separated as an aqueous solution from said solvent to defatted and desolventized oleaginous seed material.

32. An improved animal feed as defined in claim 31 wherein said oleaginous seed material is defatted soybean flakes.

33. The process as defined in claim 1 wherein the material withdrawn from steps (a) and (c) are each passed to a separation zone wherein a first and second miscella flows, respectively, are separated prior to expression of said respective slurries of solids, and wherein the first and second miscella streams of steps (c) and (d) are combined with said first and second miscella flows to form, respectively, said first and second carbohydrate-selective extraction solvent flows.

34. The apparatus as defined in claim 14 wherein said first and third conduit means include first and second separator means, respectively, for preliminary separation of solvent flow therefrom.

35. The apparatus as defined in claim 32 wherein a fourth conduit means is provided to pass said solvent flow from said second expression means and said second separator means to said first contacting means.

* * * * *